J. A. Frey.
Lamp.
Nº 60,499.   Patented Dec. 18, 1866.
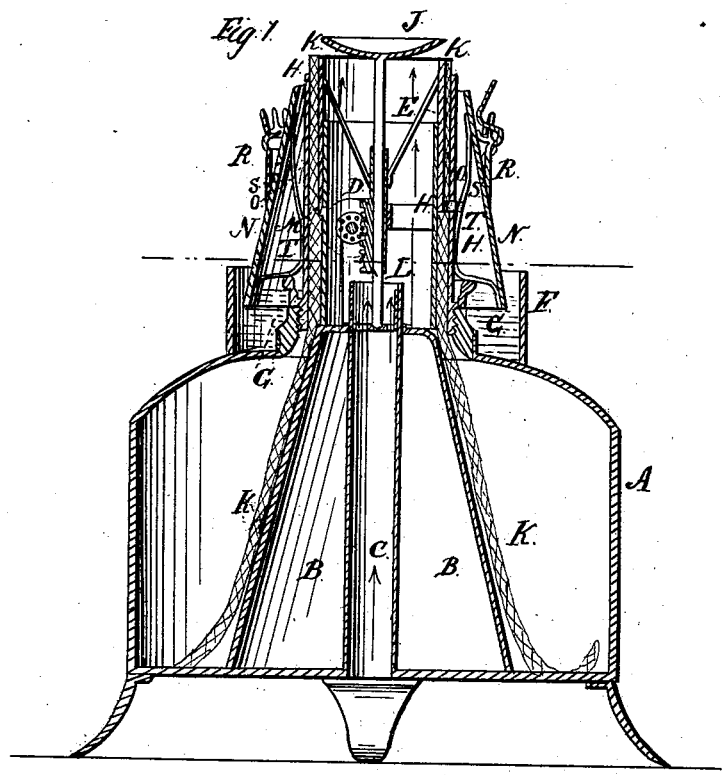
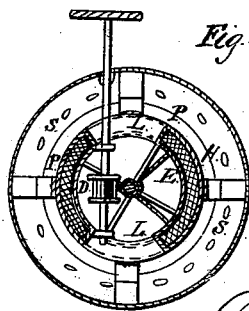
Witnesses  
John Allen  
Orrin Day  
Inventor  
John A. Frey  
by his Atty  
J Franklin Reigart

United States Patent Office.

IMPROVEMENT IN LAMP BURNERS.

JOHN A. FREY, OF WASHINGTON, DISTRICT OF COLUMBIA.

Letters Patent No. 60,499, dated December 18, 1866; antedated December 4, 1866.

*The Schedule referred to in these Letters Patent and making part of the same.*

TO ALL WHOM IT MAY CONCERN:

Be it known that I, JOHN A. FREY, of the city of Washington, District of Columbia, have invented new and useful improvements in Burners and Lamps for burning oil in the production of light; and I do hereby declare the following to be an exact description thereof, reference being had to the accompanying drawings, and to the letters of reference marked thereon, making a part of this specification, in which—

Figure 1 is a sectional view of the lamp; and

Figure 2, a top view of the burner or top of the lamp.

The nature of my invention consists in the construction of a circular burner with square apertures and perforations, to dispense with metallic tubes passing into and resting in the oil or fluid that are attached to circular burners, that invariably heat the oil and cause explosions; also to prevent the burner from being heated and melted, as frequently happens. The object also being to allow the air to pass through the sides of the round tubes or burner above the oil, to aid combustion. Also a guard on the lamp to regulate the flame in a steady, bright light, so that a sudden puff of air cannot force the flame upward in a flash, or extinguish it whilst moving the lamp. Also an outer air chamber to aid combustion by a proper draught, the air striking the top of the flame. I have also a reservoir of water in the centre of the lamp, to aid combustion and keep the oil cool and prevent the evaporation of the oil.

The lamp, A, may be made of metal or glass, and of any desirable shape or form. It is intended to contain oil for the purpose of producing light. In the centre of this lamp, A, is a cone-shaped water tube or reservoir, B, through which passes a tube, C, for the free transmission of air, and the rack and pinion, or a screw, D, is used for the purpose of raising the wick in the burner, E. On the top of the lamp is a circular guard, F, to prevent any sudden transmission of air to the burner, wick, or flame, that so frequently extinguishes the flame when the lamp is suddenly moved. The burner is attached to the lamp by a screw and socket, G. It consists of two upright circular tubes, H and E. The circular wick, K, is between the inner and outer tube, E and H. A button, J, may be used to disseminate the flame and make a more perfect combustion. On each side of the tubes, near the lamp, are apertures, L, for the transmission of air to the inside of the wick or burner. Through the tubes above the apertures L, small holes, M, are made for the transmission of air out of the lamp or burner. The outer tube, H, is surrounded by a cone-shaped apron, N, through which are two air passages, P, square-shaped, for the transmission of air to the outside of the wick or flame. An air chamber, R, is formed in the upper part of the apron N, and the air is admitted through holes, S, on the inside. The apron N supports the ordinary glass chimney, and is secured to the tubes H and E, on the inside, by springs, T. The burner can be used upon common lamps, light-houses, and head-lights or cars. One great peculiarity of the burner and lamp is, that I have no metallic tubes passing through the oil or fluid to heat and occasion a rapid evaporation, flickering, and extinction of the light, that not unfrequently melts the burner and occasions explosions. Another is, that the air is introduced above the lamp as well as through it, giving it free ventilation and aiding combustion. At all times there is more or less air in the lamp and burner between the flame and oil or fluid, and any sudden concussion forces the air from the lamp, and through the tubes, and occasions too much flame and smoke. To avoid this, the small holes, M, are made in the outer or inner tubes; they operate as safety valves, and the compressed air passes through them instead of going direct to the flame. By this combination of devices a perfect combustion is produced, one-third more light is obtained than in the common circular burners, one-third less oil or fluid is consumed, and the danger of explosions materially lessened.

In ordinary lamps the most volatile and the most valuable part of the oil or fluid is first consumed or passes off, and then a poorer quality is burned, as is fully shown by the light being diminished after it has burned ten or fifteen minutes. With the application of water in the tube B, and the free ventilation of air, the burner and the oil or fluid are kept perfectly cool, and the most volatile or valuable part is retained until consumed by the combustion, and thus the flame is increased and less quantity of oil or fluid consumed, and no danger of explosion.

What I claim as my invention, and desire to secure by Letters Patent, is—

1. The square apertures L, and the perforations M, of the circular burner, to regulate and keep the burner cool, without any metallic tubes passing into or through the oil or fluid.

2. I also claim the outer air chamber B, in combination with the apron N, and springs T, as herein described.

3. I also claim the circular guard F, on the top of the lamp, in combination with the burner, as herein described, to prevent any sudden transmission of air.

4. I also claim the cone-shaped reservoir of water in the centre of the lamp, for the purposes set forth.

JOHN A. FREY.

Witnesses:
   J. FRANKLIN REIGART,
   EDM. F. BROWN.